US012179478B2

(12) United States Patent
Liu

(10) Patent No.: US 12,179,478 B2
(45) Date of Patent: Dec. 31, 2024

(54) LABEL PRINTER WITH SEPARATED CONSUMABLES

(71) Applicant: Wuhan Jingchen Intelligent Identification Technology Co., Ltd, Wuhan (CN)

(72) Inventor: Xiong Liu, Hanchuan (CN)

(73) Assignee: Wuhan Jingchen Intelligent Identification Technology Co., Ltd, Wuhan (CN)

( * ) Notice: Subject to any disclaimer, the term of this patent is extended or adjusted under 35 U.S.C. 154(b) by 93 days.

(21) Appl. No.: 17/728,784

(22) Filed: Apr. 25, 2022

(65) Prior Publication Data

US 2023/0286289 A1 Sep. 14, 2023

(30) Foreign Application Priority Data

Mar. 11, 2022 (CN) ......................... 202210241713.1

(51) Int. Cl.

| | |
|---|---|
| ***B41J 15/04*** | (2006.01) |
| ***B41J 2/325*** | (2006.01) |
| ***B41J 3/407*** | (2006.01) |
| ***B41J 17/04*** | (2006.01) |
| ***B41J 17/32*** | (2006.01) |
| *B41J 2/32* | (2006.01) |

(52) U.S. Cl.
CPC ............. *B41J 15/044* (2013.01); *B41J 2/325* (2013.01); *B41J 3/4075* (2013.01); *B41J 17/04* (2013.01); *B41J 17/32* (2013.01); *B41J 2/32* (2013.01)

(58) Field of Classification Search
CPC ........ B41J 15/044; B41J 2/325; B41J 3/4075; B41J 17/04; B41J 17/32; B41J 2/32
See application file for complete search history.

(56) References Cited

U.S. PATENT DOCUMENTS

2018/0044128 A1* 2/2018 Sakano .................. B41J 3/4075

* cited by examiner

*Primary Examiner* — Geoffrey S Mruk
(74) *Attorney, Agent, or Firm* — DENTONS Durham Jones Pinegar

(57) ABSTRACT

This disclosure relates to a label printer with separated consumables, which includes a housing, a carbon ribbon cassette, a thermal transfer printing core, a printing head assembly and a synchronizing rotating shaft mechanism, a printing channel is arranged in the housing, and the printing head assembly is arranged on one side of the printing channel, a rubber roller assembly is provided at the other side of the printing channel, and the carbon ribbon in the carbon ribbon cassette passes through the printing channel.

4 Claims, 9 Drawing Sheets

LABEL PRINTER WITH SEPARATED CONSUMABLES

CROSS-REFERENCE TO RELATED APPLICATION

A claim for priority to the Mar. 11, 2022 filing date of CN Patent Application No. 202210241713.1, titled LABEL PRINTER WITH SEPARATED CONSUMABLES ("the '713.1 Chinese Application"), is hereby made pursuant to 35 U.S.C. § 119(a). The entire disclosure of the '713.1 Chinese Application is hereby incorporated herein.

TECHNICAL FIELD

This disclosure relates to a label printer, and more particularly, to a label printer with separated consumables.

BACKGROUND

The label paper printed by thermal transfer technology has the advantages of long-term unchanged shape, long-term preservation of text, not easy to fade, not worn due to contact with solvent, and not be deformed and discolored due to high temperature, etc., therefore, thermal transfer printers have become mainstream products on the market. The separated arrangement of the consumables solves the problem that the carbon ribbon and printing roll paper in the thermal transfer printer cannot be replaced independently during use, however, due to the need for independent carbon ribbons and printing paper, the existing thermal transfer printers with separated consumables are difficult to assemble, too large in size, and inconvenient to use.

SUMMARY

The technical problem to be solved by this disclosure is to provide a label printer with separated consumables having simple and compact structure and being convenient to use, aiming at the existing thermal transfer printers with separated consumables being too large in size, and inconvenient to use in the prior art.

The technical scheme adopted by this disclosure to solve its technical problems is: a label printer with separated consumables is provided, which includes a housing, a carbon ribbon cassette, a thermal transfer printing core, a printing head assembly and a synchronizing rotating shaft mechanism, wherein the synchronizing rotating shaft mechanism is fixed on an inner side of a bottom surface of the housing, the carbon ribbon cassette is arranged in the housing through the synchronizing rotating shaft mechanism, the thermal transfer printing core is fixed on the inner side of the bottom surface of the housing adjacent to the carbon ribbon cassette, and the printing head assembly is arranged on the thermal transfer printing core; a printing channel is arranged in the housing, and the printing head assembly is arranged on one side of the printing channel, a rubber roller assembly is provided at the other side of the printing channel, and the carbon ribbon in the carbon ribbon cassette passes through the printing channel; the housing is further provided with a printing consumables fixing compartment, a fixing column is arranged in the printing consumables fixing compartment, a paper output channel is provided on a side of the printing consumables fixing compartment, and the paper output channel is connected to the printing channel.

In the label printer with separated consumables of this disclosure, the printing roll paper is fixed in the printing consumables fixing compartment through the fixing column during the use process. One end of the printing roll paper passes through the paper output channel and the printing channel, and the carbon ribbon cassette is fixed on the synchronizing rotating shaft mechanism, the carbon ribbon of the carbon ribbon cassette passes through the printing channel, during the printing process, the thermal transfer printing is completed after the printing paper and the carbon ribbon are attached to the rubber roller assembly through the thermal transfer printing core and the printing head assembly. The thickness of the label printer with separated consumables of this disclosure is similar to that of the carbon ribbon cassette, the components are compact and simple to install, and thereby being convenient to use, and the problems of the existing consumables separated-type thermal transfer printers being bulky, and inconvenient to use are solved.

Preferably, the carbon ribbon cassette in the label printer with separated consumables of this disclosure includes an upper cassette cover and a lower cassette plate, the lower cassette plate is provided with a carbon ribbon retrieving rotating shaft, driving teeth are provided on an inner side of the carbon ribbon retrieving rotating shaft, the upper cassette cover is provided with a ratchet cantilever, the ratchet cantilever is arranged just above the driving teeth, one end of the ratchet cantilever is fixedly connected to the upper cassette cover, and a limiting block is provided on the other end of the ratchet cantilever. The limiting block has an inclined surface close to the driving teeth, a sum of the height of the limiting block and the height of the carbon ribbon retrieving device are greater than the height of the carbon ribbon cassette.

The carbon ribbon cassette in the label printer with separated consumables of this disclosure solves the problem that the carbon ribbon is easily reversely rotated in the prior art, and the reverse rotation of the carbon ribbon will guide the printed waste carbon ribbon into the new carbon ribbon of the supply reel, which may easily cause the carbon ribbon to be polluted and affects the quality of subsequent printing.

Preferably, the thermal transfer printing core in the label printer with separated consumables of this disclosure includes a bottom plate and a rotating assembly, and the rotating assembly is fixed on the bottom plate, the rotating assembly comprises a rotating rod, a first spring, a second spring and a force applying block, the rotating rod is fixed on the bottom plate through a rotating shaft and can rotate around the rotating shaft, one end of the rotating rod is provided with a pressing block, and the pressing block is arranged on a side of the rotating rod, the first spring and the second spring are oppositely arranged on both sides of the other end of the rotating rod, the first spring is on the same side as the pressing block, one end of the first spring is fixedly connected to the rotating rod, and the other end of the first spring is fixedly connected to the bottom plate, one end of the second spring is fixedly connected to the rotating rod, and the other end of the second spring is fixedly connected to the force applying block, and the force applying block is connected to an external force applying mechanism.

The thermal transfer printing core in in the label printer with separated consumables of this disclosure solves the problems that in the prior art the carbon ribbon of the integrated consumable device cannot adapt to multiple types of consumables, which makes the printer's versatility worse, and the cost of replacing the integrated mechanism is high, which also directly increases the use cost of the printer.

Preferably, the rubber roller assembly in the label printer with separated consumables of this disclosure includes a rubber roller, a rubber roller bushing and a rubber roller support, the rubber roller support is fixed on the bottom plate, and the rubber roller support is arranged adjacent to the pressing block, the rubber roller is fixedly connected to the rubber roller support through the rubber roller bushing, and the rubber roller is close to the pressing block.

Preferably, the printing head assembly in the label printer with separated consumables of this disclosure includes a printing head, a printing head support, a printing head backboard and a printing head rotating shaft, the printing head support is fixed on the rotating rod, the printing head backboard is vertically fixed on the printing head support, the printing head rotating shaft passes through the printing head support and the printing head backboard, and the printing head backboard is parallel to the printing head rotating shaft, the printing head is fixed on a side surface of the printing head backboard away from the printing head rotating shaft.

The label printer with separated consumables of this disclosure solves the problem that the shape change of the rotating rod in the prior art will cause the lamination accuracy of the printing head disposed at one end of the rotating rod to become lower, so that the printing head and the rubber roller are not fully attached, resulting in poor printing effect.

Preferably, in the label printer with separated consumables of this disclosure, a channel formed between the printing head and the rubber roller is the printing channel.

Preferably, the synchronizing rotating shaft mechanism in the label printer with separated consumables of this disclosure includes a synchronizing rotating shaft, a fixed rotating shaft, a synchronizing gear, and a synchronizing torsion spring, a transmission ring is fixed on an upper end of the synchronizing gear, and the transmission ring is provided with a notch, the synchronizing torsion spring is wrapped around the bottom of the synchronizing rotating shaft, one end of the synchronizing torsion spring is bent outward to form a torsion spring driving handle, and the torsion spring driving handle is perpendicular to an outer side surface of the synchronizing torsion spring, an outer side of the upper portion of the synchronizing rotating shaft is further provided with transmission teeth, and the transmission teeth are perpendicular to an outer wall of the synchronizing rotating shaft, the synchronizing rotating shaft is vertically placed in the transmission ring of the synchronizing gear, the torsion spring driving handle is placed in the notch, the fixed rotating shaft passes through the synchronizing rotating shaft and the synchronizing gear, and the fixed rotating shaft is vertically fixed on the bottom plate. Rotating teeth are provided on an inner wall of the carbon ribbon retrieving rotating shaft, the rotating teeth are perpendicular to an inner wall of the carbon ribbon cassette, the carbon ribbon cassette is sleeved outside the synchronizing rotating shaft, the rotating teeth and the carbon ribbon cassette are driven to rotate and recover by the transmission teeth of the synchronizing rotating shaft.

The label printer with separated consumables of this disclosure solves the above-mentioned problems of the prior art that after the carbon ribbon is recovered by the carbon ribbon retrieving rotating shaft, the same angular velocity of the gear rotation increases the linear velocity of the ribbon, this increase will become more obvious as the retrieving volume of the carbon ribbon retrieving rotating shaft increases, and the synchronization efficiency will be greatly reduced, which will directly result in the reduction of printing accuracy and the increase of printing error rate.

Preferably, the label printer with separated consumables of this disclosure further includes a motor and a driving gear set, the motor is fixed on the bottom plate, a rotating shaft of the motor passes through the bottom plate and is connected to the driving gear set, and the driving gear set is fixed on a bottom surface of the bottom plate.

The label printer with separated consumables of this disclosure has the following beneficial effects: having simple and compact structure and being convenient to use, solving the problems of the existing thermal transfer printers with separated consumables being too large in size, and inconvenient to use.

BRIEF DESCRIPTION OF THE DRAWINGS

This disclosure will be further described below in conjunction with the accompanying drawings and embodiments, in which:

FIG. 2 is a structural schematic diagram of a label printer with separated consumables of this disclosure when the housing is opened and a carbon ribbon cassette and a printing roll paper are put in;

DETAILED DESCRIPTION

In order to have a clearer understanding of the technical features, objects and effects of this disclosure, the specific embodiments of this disclosure will now be described in detail with reference to the accompanying drawings.

Figure 1:
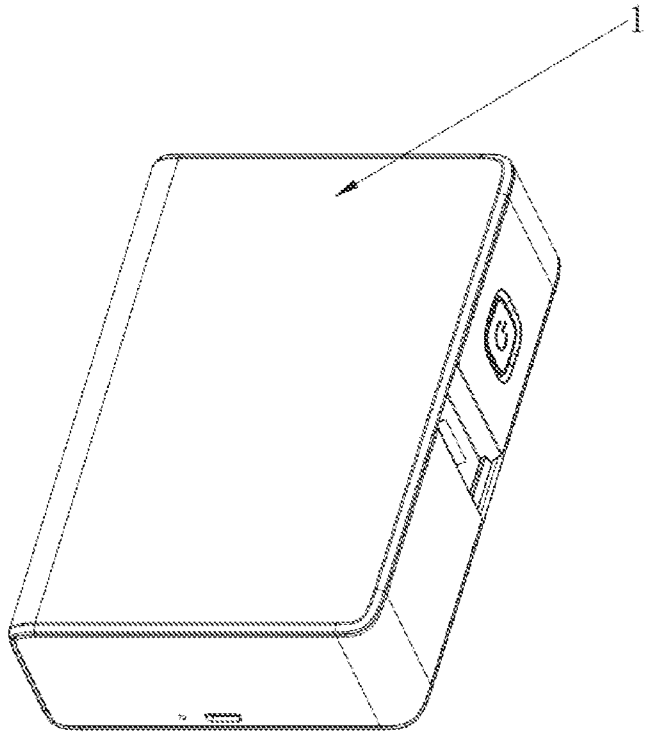
FIG. 1 is a structural schematic diagram of a label printer with separated consumables of this disclosure when the housing is closed.
Figure 2:
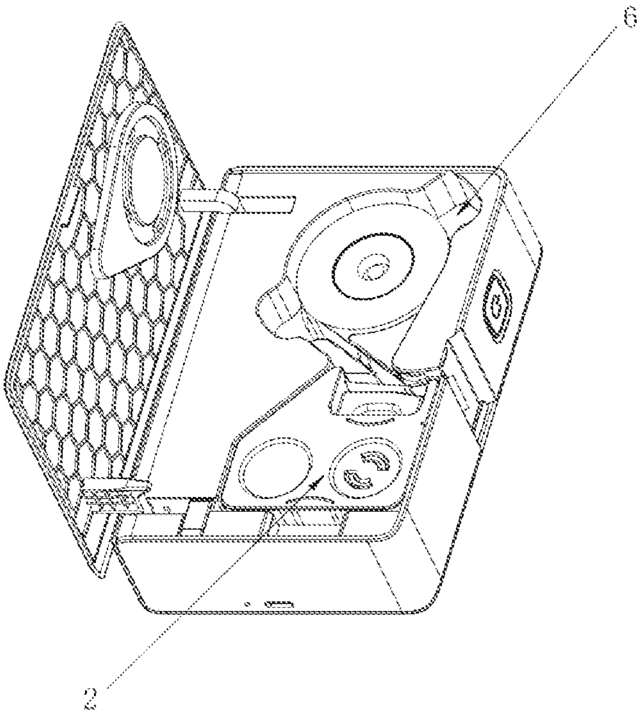
Figure 3:
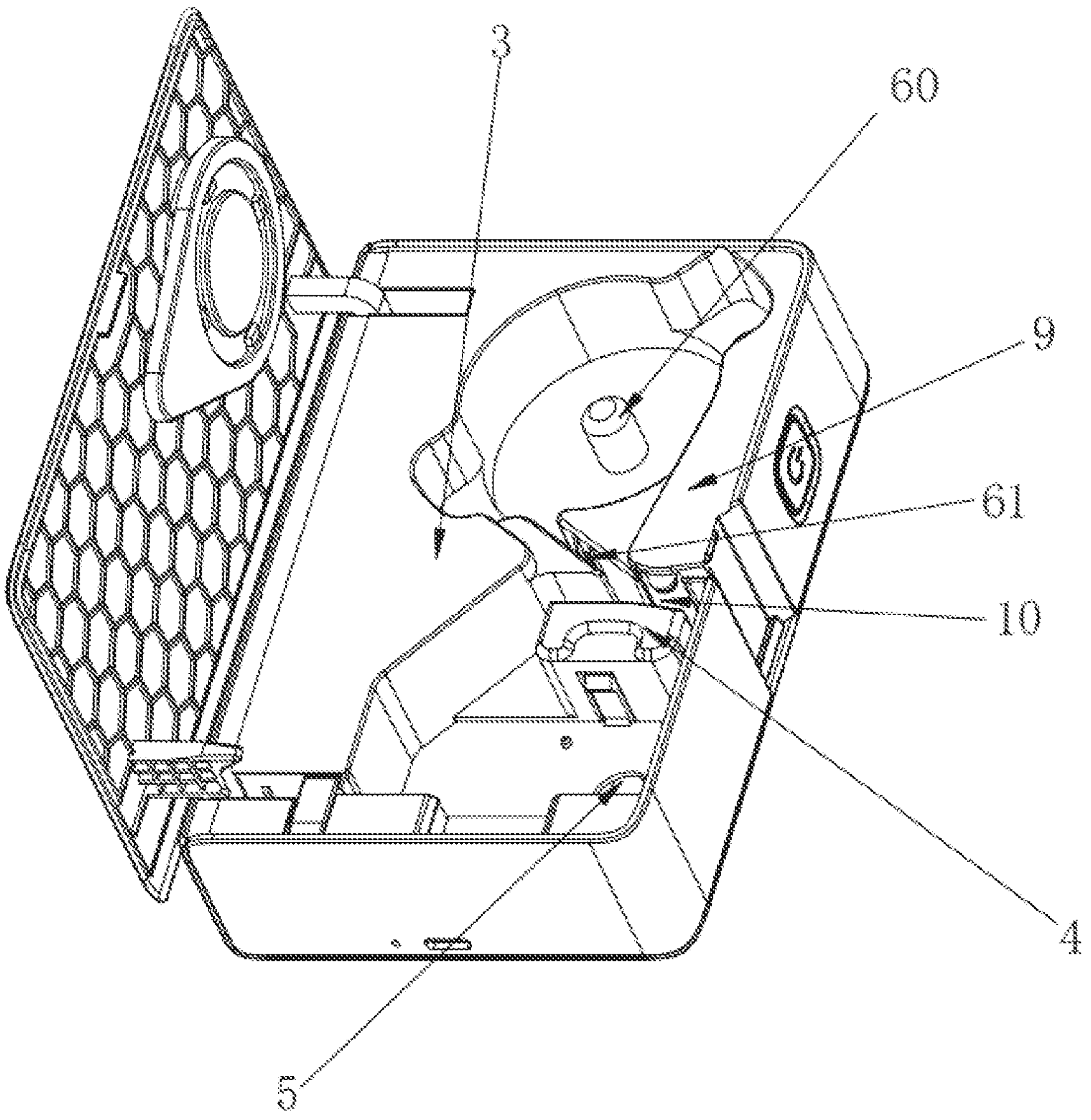
FIG. 3 is a schematic diagram of a label printer with separated consumables of this disclosure when the housing is opened without placing the carbon ribbon cassette and printing roll paper.

As shown in FIG. 1, FIG. 2, and FIG. 3, a specific embodiment of this disclosure is provided, a label printer with separated consumables according to this embodiment includes a housing 1, a carbon ribbon cassette 2, a thermal transfer printing core 3, a printing head assembly 4 and a synchronizing rotating shaft mechanism 5, the synchronizing rotating shaft mechanism 5 is fixed on an inner side of a bottom surface of the housing 1, the carbon ribbon cassette 2 is arranged in the housing 1 through the synchronizing rotating shaft mechanism 5, the thermal transfer printing core 3 fixed on the inner side of the bottom surface of the housing 1 is located adjacent to the carbon ribbon cassette 2, and the printing head assembly 4 is arranged on the thermal transfer printing core 3.

A printing channel 10 is arranged in the housing 1, and the printing head assembly 4 is arranged on one side of the printing channel 10, a rubber roller assembly 9 is provided at the other side of the printing channel 10, and the carbon ribbon in the carbon ribbon cassette 2 passes through the printing channel 10.

The housing 1 is further provided with a printing consumables fixing compartment 6, a fixing column 60 is arranged in the printing consumables fixing compartment 6, a paper output channel 61 is provided on a side of the printing consumables fixing compartment 6, and the paper output channel 61 is connected to the printing channel 10.

In the label printer with separated consumables of this embodiment, the printing roll paper is fixed in the printing consumables fixing compartment 6 through the fixing column 60 during the use process. One end of the printing roll paper passes through the paper output channel 61 and the printing channel 10, and the carbon ribbon cassette 2 is fixed on the synchronizing rotating shaft mechanism 5, the carbon ribbon of the carbon ribbon cassette 2 passes through the printing channel 10, during the printing process, the thermal transfer printing is completed after the printing paper and the carbon ribbon are attached to the rubber roller assembly 9 through the thermal transfer printing core 3 and the printing head assembly 4. The thickness of the label printer with separated consumables of this disclosure is approximately the same as that of the carbon ribbon cassette 2, the components are compact and simple to install and thereby convenient to use, and the problems of the existing consumables separated-type thermal transfer printers being too large in size and inconvenient to use are solved.

Figure 4:
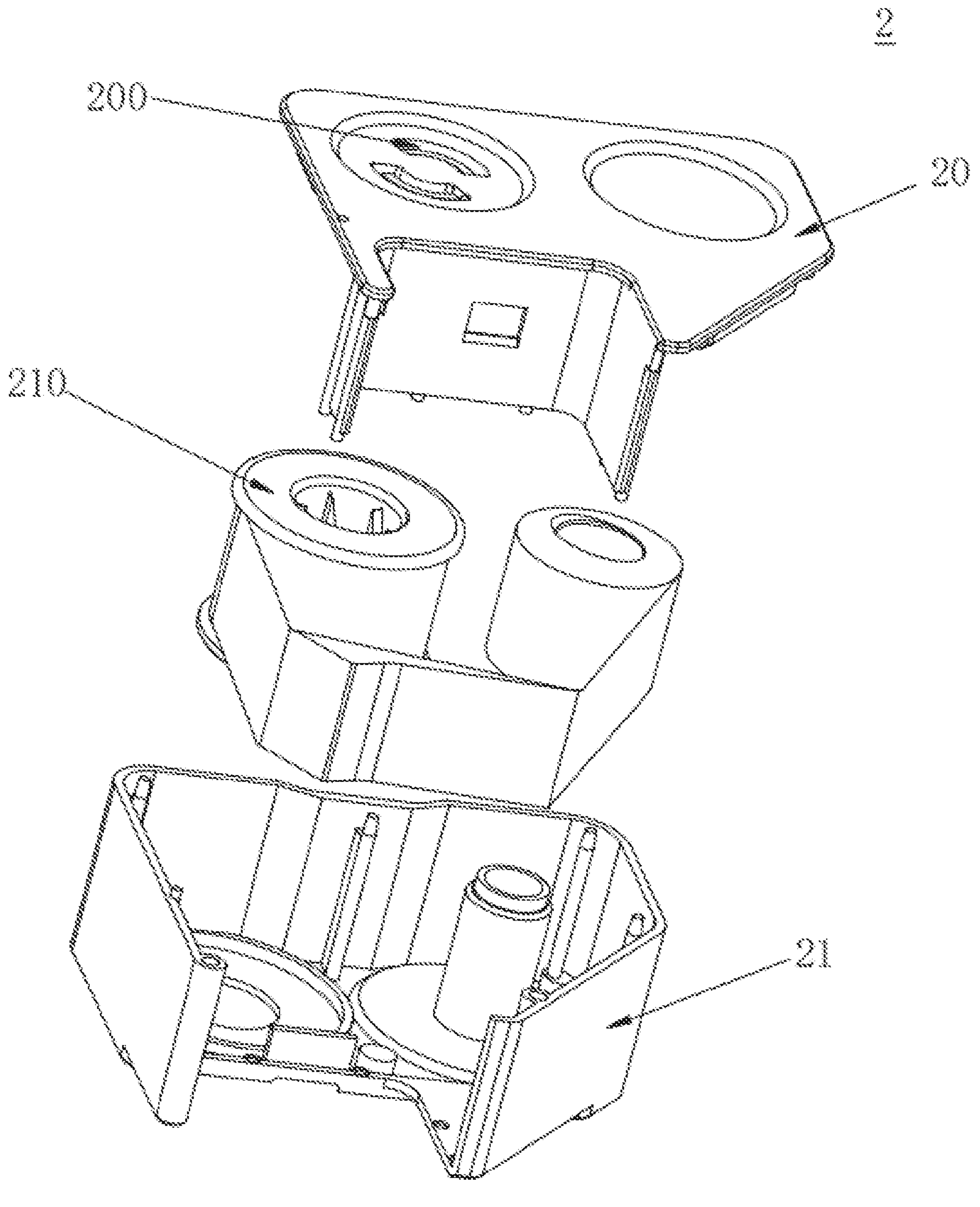
FIG. 4 is an exploded view of a carbon ribbon cassette of a label printer with separated consumables of this disclosure.
Figure 5:
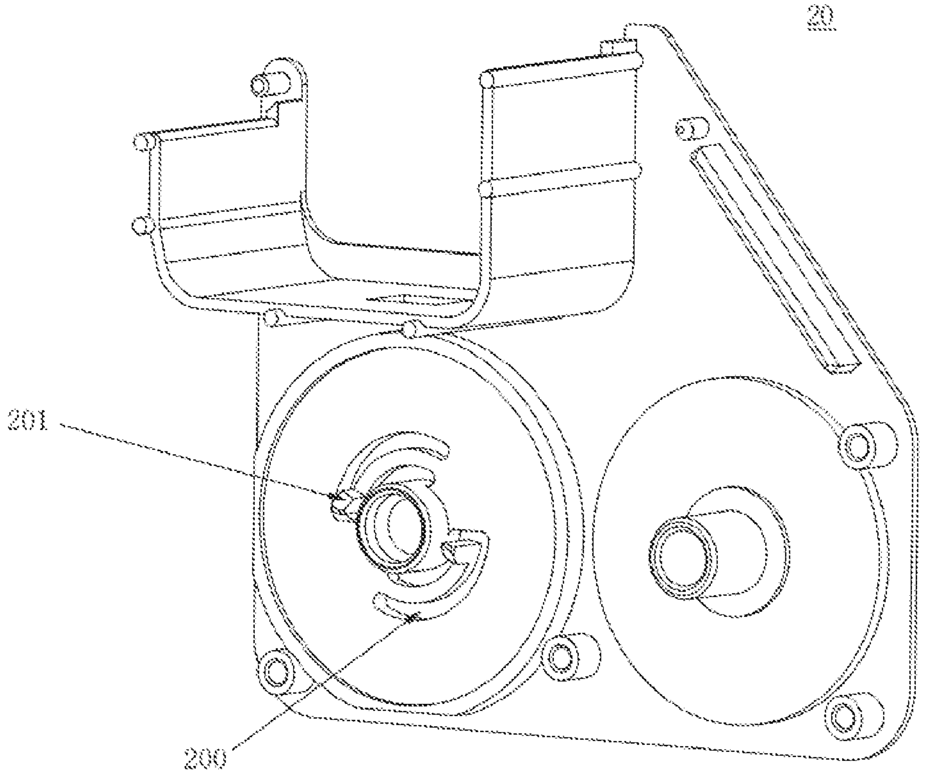
FIG. 5 is a structural schematic diagram of the upper cassette cover of the carbon ribbon cassette of this disclosure.
Figure 6:
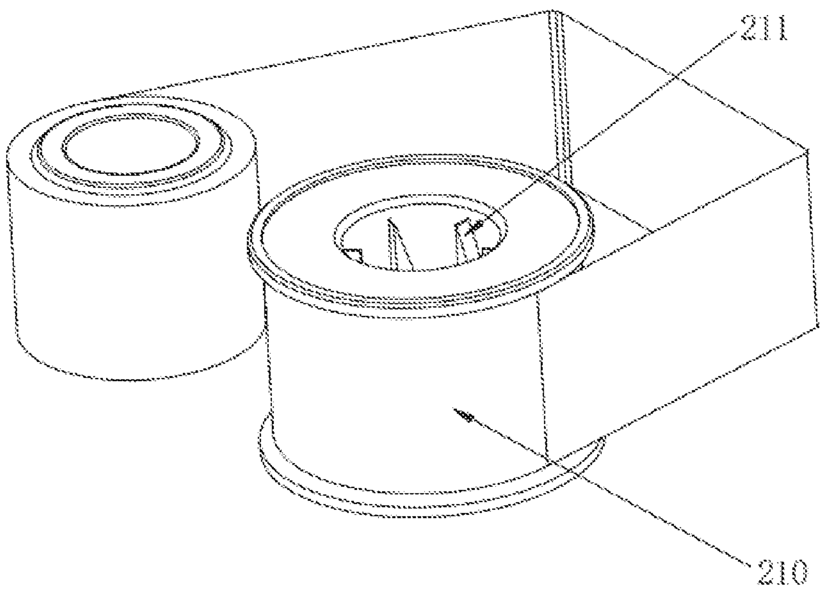
FIG. 6 is a structural schematic diagram of the carbon ribbon retrieving rotating shaft of this disclosure.

As shown in FIG. 4, FIG. 5, and FIG. 6, the carbon ribbon cassette 2 in the above-mentioned embodiment includes an upper cassette cover 20 and a lower cassette plate 21, the lower cassette plate 21 is provided with a carbon ribbon retrieving rotating shaft 210, driving teeth 211 are provided on an inner side of the carbon ribbon retrieving rotating shaft 210, the upper cassette cover 20 is provided with a ratchet cantilever 200, the ratchet cantilever 200 is arranged just above the driving teeth 211, one end of the ratchet cantilever 200 is fixedly connected to the upper cassette cover 20, and a limiting block 201 is provided on the other end of the ratchet cantilever 200.

The limiting block 201 has an inclined surface close to the driving teeth 211, a sum of the height of the limiting block 201 and the height of the carbon ribbon retrieving device 210 are greater than the height of the carbon ribbon cassette 2.

In the carbon ribbon cassette 2 in this embodiment, the carbon ribbon retrieving rotating shaft 210 is rotated by an external force applied to the driving teeth 211, so that the waste carbon ribbon is recovered. During the recycling rotation of the carbon ribbon retrieving rotating shaft 210, the driving teeth 211 contact the inclined surface of the limiting block 201 at the ratchet cantilever 200, and the inclined surface provides a rotational damping for the rotation of the carbon ribbon retrieving rotating shaft 210, so that the rotation of the carbon ribbon retrieving rotating shaft 210 will not be too fast, to avoid the carbon ribbon retrieving rotating shaft 210 from rotating too fast and recovering the unprinted ribbon, resulting in waste of the ribbon. At the same time, when the carbon ribbon retrieving rotating shaft 210 is reversely rotated, the surface of the limiting block 201 opposite to the inclined surface will block the driving teeth 211, so that the carbon ribbon retrieving rotating shaft 210 fails to reverse rotation, thereby solving the problem that the carbon ribbon is easily reversely travelled in the prior art, the reverse travel of the carbon ribbon will guide the printed waste carbon ribbon into the new carbon ribbon at the supply reel, which may easily cause the carbon ribbon to be polluted and affect the quality of subsequent printing.

Figure 7:
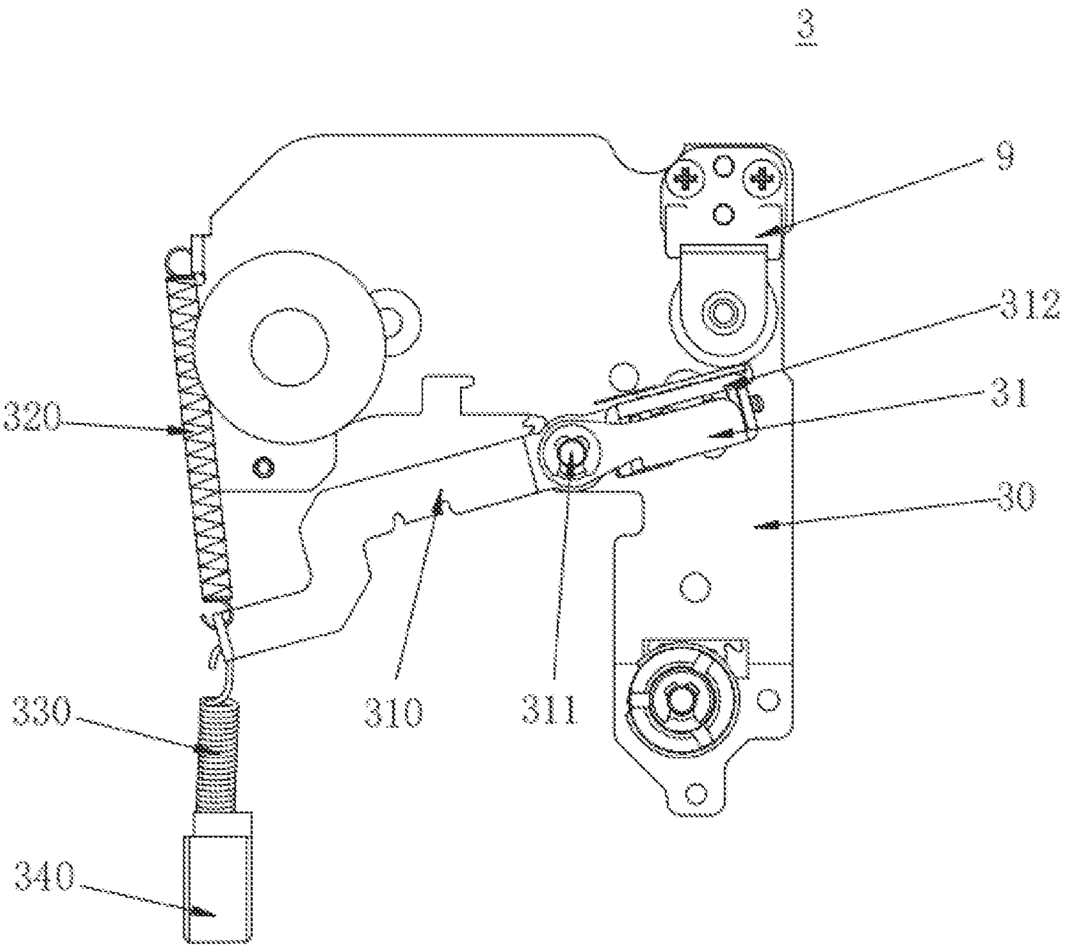
FIG. 7 is a structural schematic diagram of the thermal transfer printing machine of this disclosure.

As shown in FIG. 7, the thermal transfer printing core 3 in the above-mentioned embodiment includes a bottom plate 30 and a rotating assembly 31, and the rotating assembly 31 is fixed on the bottom plate 30, the rotating assembly 31 comprises a rotating rod 310, a first spring 320, a second spring 330 and a force applying block 340, the rotating rod 310 is fixed on the bottom plate 30 through a rotating shaft 311 and can rotate around the rotating shaft 311, one end of the rotating rod 310 is provided with a pressing block 312, and the pressing block 312 is arranged on a side of the rotating rod 310. The first spring 320 and the second spring 330 are oppositely arranged on both sides of the rotating rod 310 at its another end, the first spring 320 and the pressing block 312 are located on the same side of the rotating rod 310, one end of the first spring 320 is fixedly connected to the rotating rod 310, and the other end of the first spring 320 is fixedly connected to the bottom plate 30, one end of the second spring 330 is fixedly connected to the rotating rod 310, and the other end of the second spring 330 is fixedly connected to the force applying block 340, and the force applying block 340 is connected to an external force applying mechanism.

During the operating process of the thermal transfer printing core 3 of this embodiment, the gap between the pressing block 312 and the rubber roller assembly 9 is the printing channel. During the printing process, the external force applying mechanism applies a pulling force to the force applying block 340, so that the force applying block 340 pulls the second spring 330 and thus forces the rotating rod 310 to rotate. The rotating rod 310 rotates to move the pressing block 312 to the rubber roller assembly 9 until the pressing block 312 is close to the rubber roller, so that the printing ribbon and the printing consumables are in contact, thereby completing the thermal transfer printing. After the printing is completed, the pressure applied by the external force applying mechanism on the force applying block 340 is removed, so that the first spring 320 and the second spring 330 are restored, the first spring 320 forces the rotating rod 310 to rotate, and the pressing block 312 moves away from the rubber roller assembly 9, so that the printing ribbon and printing consumables between the pressing block 312 and the rubber roller assembly are separated, thereby solving the problems that in the prior art the carbon ribbon of the integrated printer cannot adapt to multiple types of consumables, which makes the printer's versatility worse, and the cost of replacing the integrated printer is high, which also directly increases the use cost of the printer.

Figure 8:
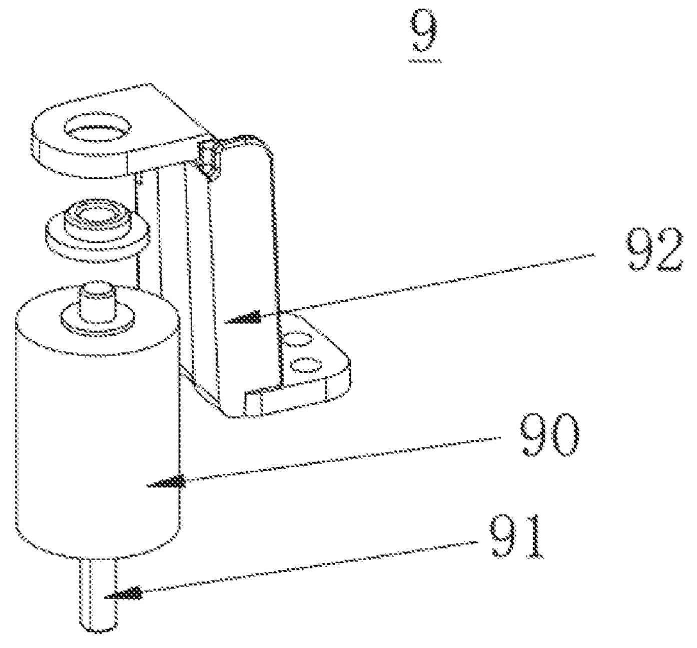
FIG. 8 is a structural schematic diagram of the rubber roller assembly of this disclosure.
Figure 9:
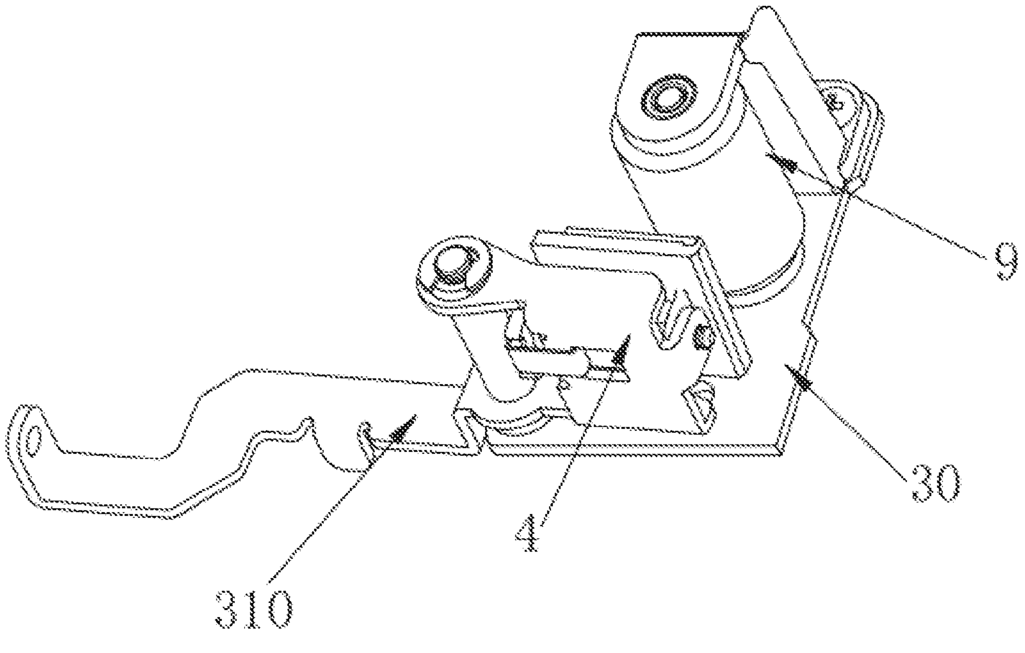
FIG. 9 is a structural schematic diagram of the printing head assembly and the rubber roller assembly of this disclosure.
Figure 10:
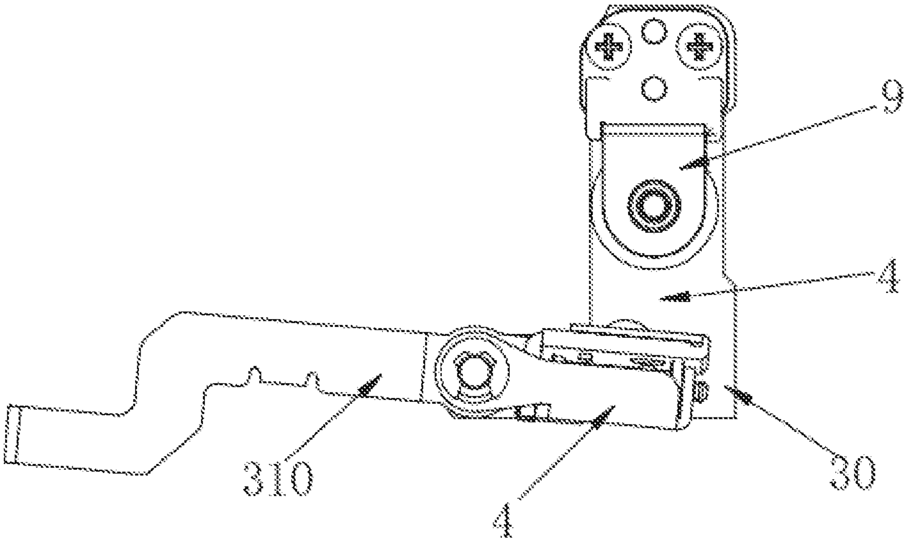
FIG. 10 is a top view of the printing head assembly and the rubber roller assembly of this disclosure.
Figure 11:
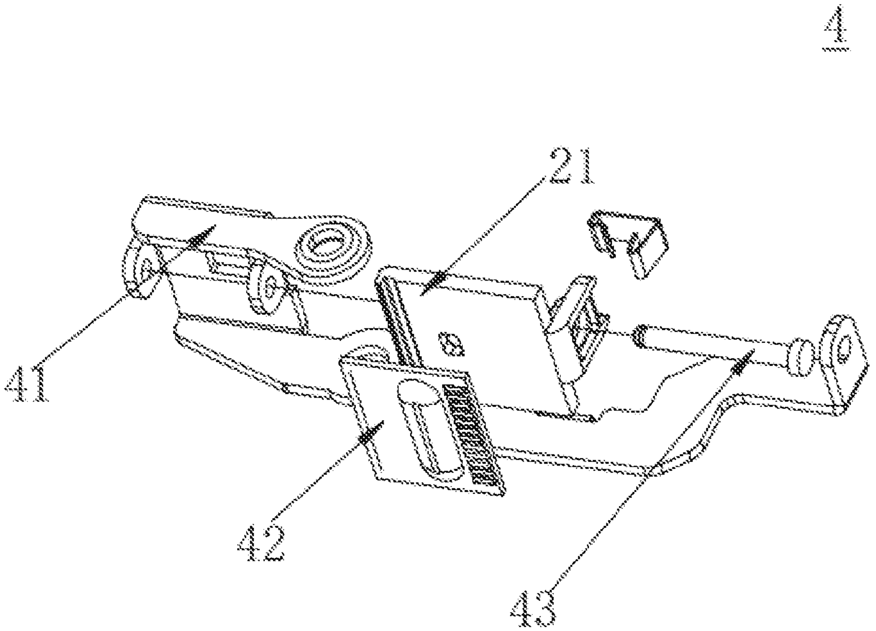
FIG. 11 is an exploded view of the printing head assembly of this disclosure.
Figure 12:
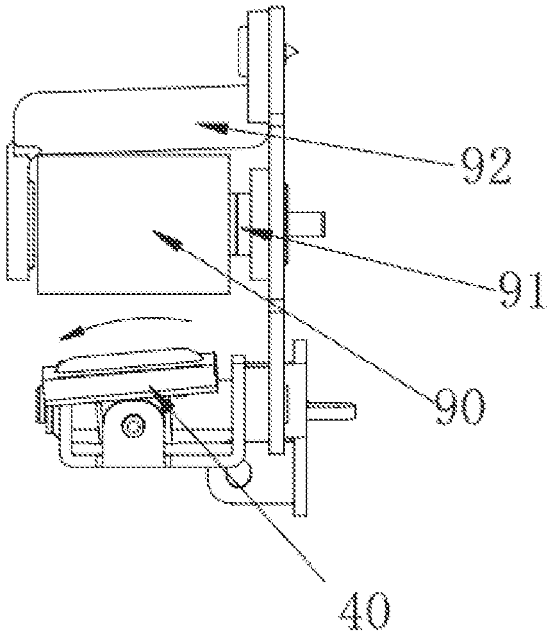
FIG. 12 is a structural schematic diagram of the printing head and the rubber roller of this disclosure when operating.

As shown in FIG. 8, the rubber roller assembly 9 in the above-mentioned embodiment includes a rubber roller 90, a rubber roller bushing 91 and a rubber roller support 92, the rubber roller support 92 is fixed to the bottom plate 30, and the rubber roller support 92 is arranged adjacent to the pressing block 312, the rubber roller 90 is fixedly connected to the rubber roller support 92 through the rubber roller bushing 91, and the rubber roller 90 is close to the pressing block 312.

As shown in FIG. 9, FIG. 10, FIG. 11, and FIG. 12, the printing head assembly 4 in the above-mentioned embodiment includes a printing head 40, a printing head support 41, a printing head backboard 42 and a printing head rotating shaft 43, the printing head support 41 is fixed on the rotating rod 310, the printing head backboard 42 is vertically fixed on the printing head support 41, the printing head rotating shaft 43 passes through the printing head support 41 and the printing head backboard 42, and the printing head backboard 42 is parallel to the printing head rotating shaft 43, the printing head 40 is fixed on a side surface of the printing head backboard 42 away from the printing head rotating shaft 43.

During the operating process of the adaptive printing head in this embodiment, the printing head 40 is rotated through the printing head rotating shaft 43, so that the printing head 40 presses the carbon ribbon and printing consumables to the rubber roller 90, and the printing head applies force to the carbon ribbon and printing consumables evenly. The rubber roller rotates through the rubber roller bushing 91, which drives the carbon ribbon and printing consumables to move outward for printing, thereby solving the problem that the shape change of the rotating rod in the prior art will cause the positioning accuracy of the printing head disposed at one end of the rotating rod to become lower (the printing head and the rubber roller are not fully attached, resulting in poor printing effect).

In the above-mentioned embodiment, a channel formed between the printing head 40 and the rubber roller 90 is the printing channel 10.

Figure 13:
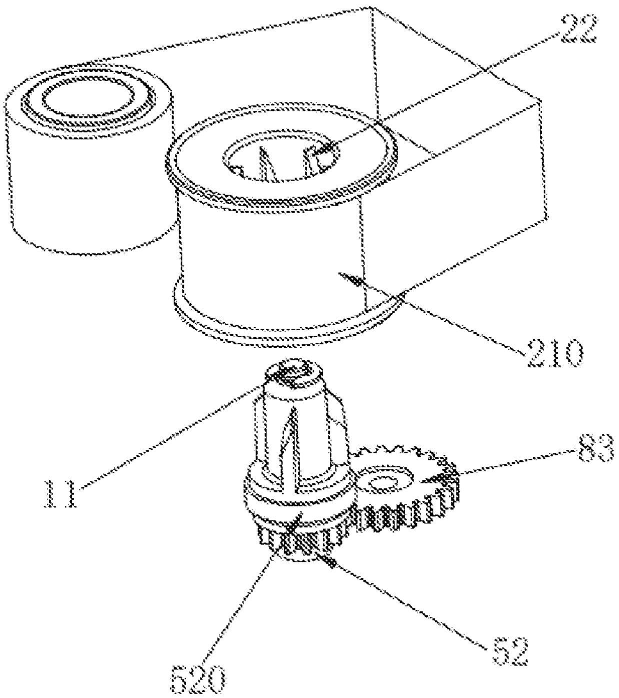
FIG. 13 is a structural schematic diagram of the carbon ribbon retrieving rotating shaft and the synchronizing rotating shaft mechanism of this disclosure.
Figure 14:
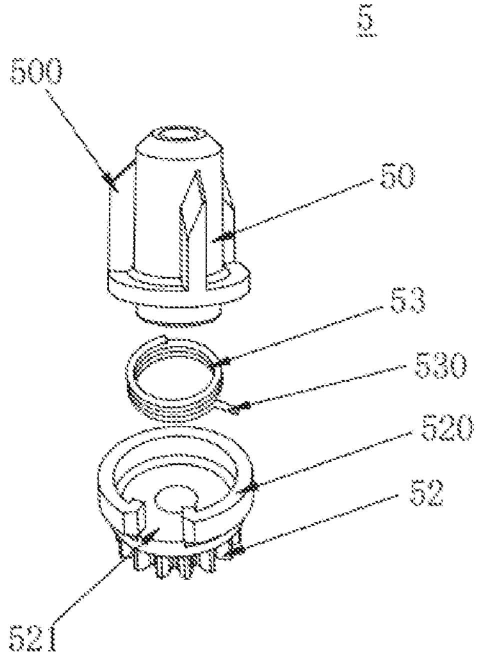
FIG. 14 is an exploded view of the synchronizing rotating shaft mechanism of this disclosure.

As shown in FIG. 13 and FIG. 14, the synchronizing rotating shaft mechanism 5 in the above-mentioned embodiment includes a synchronizing rotating shaft 50, a fixed rotating shaft 51, a synchronizing gear 52, and a synchronizing torsion spring 53, a transmission ring 520 is fixed on an upper end of the synchronizing gear 52, and the transmission ring 520 is provided with a notch 521, the synchronizing torsion spring 53 is wrapped around the outer side of the synchronizing rotating shaft 50 at its bottom, one end of the synchronizing torsion spring 53 is bent outward to form a torsion spring driving handle 530, and the torsion spring driving handle 530 is perpendicular to an outer side surface of the synchronizing torsion spring 53, an outer side of an upper half of the synchronizing rotating shaft 50 is further provided with transmission teeth 500, and the transmission teeth 500 are perpendicular to an outer wall of the synchronizing rotating shaft 50, the synchronizing rotating shaft 50 is vertically placed in the transmission ring 520 of the synchronizing gear 52, the torsion spring driving handle 530 is placed in the notch 521, the fixed rotating shaft 51 passes through the synchronizing rotating shaft 50 and the synchronizing gear 52, and the fixed rotating shaft 51 is vertically fixed on the bottom plate 30.

Rotating teeth 22 are provided on an inner wall of the carbon ribbon retrieving rotating shaft 210, the rotating teeth 22 are perpendicular to an inner wall of the carbon ribbon cassette 2, the carbon ribbon cassette 2 is sleeved outside the synchronizing rotating shaft 50, the rotating teeth 22 and the carbon ribbon cassette 2 are driven to rotate and recover by the transmission teeth 500 of the synchronizing rotating shaft 50.

During the operating process of the synchronizing rotating shaft mechanism 5 of this embodiment, the printing paper roll and the driving gear in this disclosure are driven to rotate by the driving device in the printer, the driving gear drives the synchronizing gear 52 to rotate, and the synchronizing gear 52 drives the transmission ring 520 to rotate, the notch 521 on the transmission ring 520 rotates to apply a rotational force to the torsion spring drive handle 530, so that the synchronizing rotating shaft 51 rotates, and the synchronizing rotating shaft 51 drives the carbon ribbon retrieving rotating shaft 210 to rotate, at the same time, when the transmission ring 520 applies a force on the torsion spring driving handle 530, the synchronizing torsion spring 53 is changed, so that the force exerted by the synchronizing torsion spring 53 on the outer wall of the carbon ribbon synchronizing rotating shaft 210 becomes smaller, this change will increase as the "retrieving amount" of the carbon ribbon synchronizing rotating shaft 210 increases, so that the rotational angular velocity of the synchronizing rotating shaft 51 relative to the angular velocity of the printing paper roll will become smaller, in this way, the linear speed of the rotation of the recovered carbon ribbon can be kept the same under the condition that the angular speed of the rotation of the driving gear is the same, thereby solving the above-mentioned problems of the prior art that after the carbon ribbon is recovered by the carbon ribbon synchronizing rotating shaft 210, gears rotating at the same angular velocity will increase the linear velocity of the ribbon, this increase will become more obvious as the retrieving volume of the carbon ribbon retrieving rotating shaft increases, and the synchronization efficiency will be greatly reduced, which will directly result in the reduction of printing accuracy and the increase of printing error rate.

Figure 15:
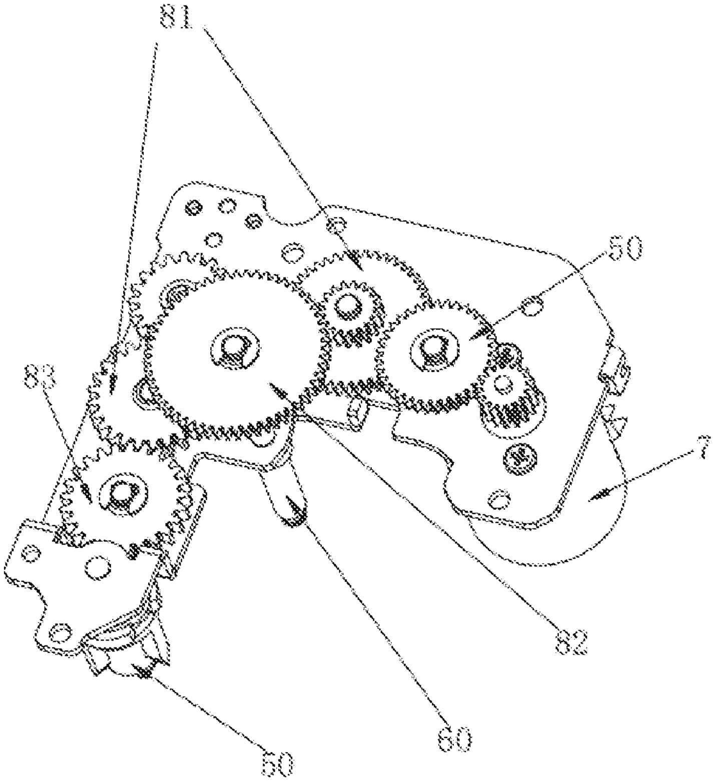
FIG. 15 is a structural schematic diagram of the motor and the driving gear set of this disclosure.

As shown in FIG. 15, the above-mentioned embodiment further includes a motor 7 and a driving gear set 8, the motor 7 is fixed on the bottom plate 30, a rotating shaft of the motor 7 passes through the bottom plate 30 and is connected to the driving gear set 8, and the driving gear set 8 is fixed on a bottom surface of the bottom plate 30.

The driving gear set 8 in this embodiment includes a main gear 80, a transmission gear 81, a first driving gear 82 and a second driving gear 83, the motor 7 passes through the center of the main gear 80, the main gear 80 is connected to the transmission gear 81, and the transmission gear 81 is connected to the first driving gear 82 and the second driving gear 83, the fixing column 60 in the printing consumables fixing compartment 6 is connected to the center of the first driving gear 82 through the bottom of the housing 1, and the second driving gear 83 is connected to the synchronizing gear 52. During the operation of the consumables separated type printer in this embodiment, the motor 7 drives the main gear 80 to rotate, and the main gear 80 drives the first driving gear 82 and the second driving gear 83 to rotate through the transmission gear 81, the fixing column 60 rotates synchronizingly with the first driving gear 82, the synchronizing gear 52 rotates synchronizingly with the second driving gear 83, the printing paper roll placed in the printing consumables fixing compartment 6 will rotate synchronizingly with the carbon ribbon retrieving rotating shaft 210, so that the supply and retrieving of the consumables can be performed synchronizingly.

The embodiments of this disclosure have been described above in conjunction with the accompanying drawings, however, this disclosure is not limited to the above-mentioned specific embodiments, and the above-mentioned specific embodiments are only illustrative, not restrictive, under the inspiration of this disclosure, those of ordinary skill in the art can make many modifications without departing from the spirit of this disclosure and the scope protected by the claims, which all belong to the protection scope of this disclosure.

What is claimed:

1. A label printer with separated consumables, comprising a housing (1), a carbon ribbon cassette (2), a thermal transfer printing core (3), a printing head assembly (4) and a synchronizing rotating shaft mechanism (5), wherein the synchronizing rotating shaft mechanism (5) is fixed on the inner side of the bottom surface of the housing (1), the carbon ribbon cassette (2) is arranged in the housing (1) through the synchronizing rotating shaft mechanism (5), the thermal transfer printing core (3) fixed on the inner side of the bottom surface of the housing (1) is located adjacent to the carbon ribbon cassette (2), and the printing head assembly (4) is arranged on the thermal transfer printing core (3);

wherein a printing channel (10) is arranged in the housing (1), and the printing head assembly (4) is arranged on one side of the printing channel (10), a rubber roller assembly (9) is provided at the other side of the printing channel (10), and the carbon ribbon in the carbon ribbon cassette (2) passes through the printing channel (10); and wherein the housing (1) is further provided with a printing consumables fixing compartment (6), a fixing column (60) is arranged in the printing consumables fixing compartment (6), a paper output channel (61) is provided on the side of the printing consumables fixing compartment (6), and the paper output channel (61) is connected to the printing channel (10).

2. The label printer of claim 1, wherein, the carbon ribbon cassette (2) comprises an upper cassette cover (20) and a lower cassette plate (21), the lower cassette plate (21) is provided with a carbon ribbon retrieving rotating shaft (210), driving teeth (211) are provided on the inner side of the carbon ribbon retrieving rotating shaft (210), the upper cassette cover (20) is provided with a ratchet cantilever (200), the ratchet cantilever (200) is arranged just above the driving teeth (211), one end of the ratchet cantilever (200) is fixedly connected to the upper cassette cover (20), and a limiting block (201) is provided on the other end of the ratchet cantilever (200), wherein the limiting block (201) has an inclined surface close to the driving teeth (211), a sum of the height of the limiting block (201) and the height of the carbon ribbon retrieving device (210) are greater than the height of the carbon ribbon cassette (2).

3. The label printer of claim 1, wherein, the synchronizing rotating shaft mechanism (5) comprises a synchronizing rotating shaft (50), a fixed rotating shaft (51), a synchronizing gear (52), and a synchronizing torsion spring (53), a transmission ring (520) is fixed on the upper end of the synchronizing gear (52), and the transmission ring (520) is provided with a notch (521), the synchronizing torsion spring (53) is wrapped around the bottom of the synchronizing rotating shaft (50), one end of the synchronizing torsion spring (53) is bent outward to form a torsion spring driving handle (530), and the torsion spring driving handle (530) is perpendicular to the outer side surface of the synchronizing torsion spring (53), the synchronizing rotating shaft (50) is further provided with transmission teeth (500) on the outer surface of its upper portion, and the transmission teeth (500) are perpendicular to an outer wall of the synchronizing rotating shaft (50), the synchronizing rotating shaft (50) is vertically placed in the transmission ring (520) of the synchronizing gear (52), the torsion spring driving handle (530) is placed in the notch (521), the fixed rotating shaft (51) passes through the synchronizing rotating shaft (50) and the synchronizing gear (52), and the fixed rotating shaft (51) is vertically fixed on the bottom plate (30);

rotating teeth (22) are provided on an inner wall of the carbon ribbon retrieving rotating shaft (210), the rotating teeth (22) are perpendicular to an inner wall of the carbon ribbon cassette (2), the carbon ribbon cassette (2) is sleeved outside the synchronizing rotating shaft (50), the rotating teeth (22) and the carbon ribbon cassette (2) are driven to rotate and recover by the transmission teeth (500) of the synchronizing rotating shaft (50).

4. The label printer of claim 1, wherein, further comprises a motor (7) and a driving gear set (8), the motor (7) is fixed on the bottom plate (30), a rotating shaft of the motor (7) passes through the bottom plate (30) and is connected to the driving gear set (8), and the driving gear set (8) is fixed on the bottom surface of the bottom plate (30).

* * * * *